United States Patent [19]
Kuper et al.

[11] Patent Number: 5,555,329
[45] Date of Patent: Sep. 10, 1996

[54] LIGHT DIRECTING OPTICAL STRUCTURE

[75] Inventors: Jerry Kuper, Martinsville; Leon Segal, Randolph; Karl W. Beeson, Princeton; Scott M. Zimmerman, Basking Ridge, all of N.J.

[73] Assignee: AlliedSignal Inc., Morris Township, N.J.

[21] Appl. No.: 376,709

[22] Filed: Jan. 23, 1995

Related U.S. Application Data

[63] Continuation-in-part of Ser. No. 149,219, Nov. 5, 1993, Pat. No. 5,424,406, and Ser. No. 242,525, May 13, 1994, Pat. No. 5,428,468, and Ser. No. 321,368, Oct. 11, 1994.

[51] Int. Cl.⁶ .................................... G02B 6/34
[52] U.S. Cl. .................. 385/36; 359/630; 385/147
[58] Field of Search ........................... 359/484, 281, 359/487, 834, 634, 636, 850, 630; 356/350, 399, 154; 250/227.21, 231.14, 231.13; 385/31, 34, 36, 37, 39, 120, 121, 147

[56] References Cited

U.S. PATENT DOCUMENTS

| | | | |
|---|---|---|---|
| 3,684,384 | 8/1972 | Hojo et al. | 356/399 |
| 3,863,246 | 1/1975 | Trcka et al. | 377/487 |
| 3,923,584 | 12/1975 | Hojo et al. | 156/379 |
| 3,941,467 | 3/1976 | Kapany et al. | 359/834 |
| 3,987,299 | 10/1976 | Mulder | 359/634 |

(List continued on next page.)

FOREIGN PATENT DOCUMENTS

| | | | |
|---|---|---|---|
| 0500960A1 | 2/1992 | European Pat. Off. | G02B 6/00 |
| 2736486 | 12/1977 | Germany | G03B 5/14 |
| 60-201326 | 10/1985 | Japan | G02F 1/33 |
| 62-23022 | 1/1987 | Japan . | |
| 64-35416 | 2/1989 | Japan | G02F 1/33 |
| 4-86620 | 3/1992 | Japan . | |
| 45505 | 2/1993 | Japan | G02B 5/02 |
| 60908 | 3/1993 | Japan | G02B 5/02 |
| 89827 | 4/1993 | Japan | H01J 61/00 |
| 5-127159 | 5/1993 | Japan . | |
| 5-224020 | 9/1993 | Japan . | |
| 5-333334 | 12/1993 | Japan . | |
| 5-341132 | 12/1993 | Japan . | |
| 6-18879 | 1/1994 | Japan . | |
| 6-27327 | 2/1994 | Japan . | |
| 6-82634 | 3/1994 | Japan . | |
| 6-67178 | 3/1994 | Japan . | |
| 6-180446 | 6/1994 | Japan . | |
| 6-194648 | 7/1994 | Japan . | |
| 6-208113 | 7/1994 | Japan . | |
| 6-202107 | 7/1994 | Japan . | |
| 6-250182 | 9/1994 | Japan . | |
| WO94/00780 | 1/1994 | WIPO | G02B 3/02 |
| WO94/06051 | 3/1994 | WIPO | G02B 5/02 |
| WO94/09395 | 4/1994 | WIPO | G02B 6/04 |

*Primary Examiner*—Akm E. Ullah
*Attorney, Agent, or Firm*—Verne E. Kreger, Jr.

[57] ABSTRACT

A light directing optical structure is formed of a light waveguide preferably made of clear plastic; attached to or formed with the waveguide are a multiplicity of prisms. Each prism, due to its index of refraction, provides an aperature where light may escape the waveguide rather than remain confined due to total internal refraction. The light escaping the waveguide is reflected from a side face of the prism, and redirected in a desired direction. The propagation paths within the waveguide are such that the light emerging through the aperature is of only a fairly closely constrained range of angles; as a result the light that is redirected by the side face of the prism is of a similarly constrained range of angles.

The geometry of the prism can be optimized to direct the output light perpendicular to the plane, or at a desired angle other than perpendicular. The optical structure can receive a light input along an edge, or along several edges, and its output beam is perpendicular to the structure or at some desired angle other than perpendicular. There is no restriction on the distribution and uniformity of the light input, yet the ouput is a directed and intensity controlled light source. Configurations are disclosed adapting the structure to several different possible light distribution patterns.

26 Claims, 7 Drawing Sheets

U.S. PATENT DOCUMENTS

| | | | |
|---|---|---|---|
| 3,988,057 | 10/1976 | Kapany et al. | 359/834 |
| 4,043,636 | 8/1977 | Eberhardt et al. | 359/48 |
| 4,330,813 | 5/1982 | Deutsch | 359/48 |
| 4,365,869 | 12/1982 | Hareng et al. | 350/345 |
| 4,654,523 | 3/1987 | Tanaka et al. | 250/227.21 |
| 4,686,519 | 8/1987 | Yoshida et al. | 340/701 |
| 4,726,662 | 2/1988 | Cromack | 350/345 |
| 4,799,137 | 1/1989 | Aho | 362/309 |
| 4,874,228 | 10/1989 | Aho et al. | 350/345 |
| 5,040,878 | 8/1991 | Eichenlaub | 350/345 |
| 5,050,946 | 9/1991 | Hathaway et al. | 385/33 |
| 5,099,343 | 3/1992 | Margerum et al. | 359/48 |
| 5,101,279 | 3/1992 | Kurematsu et al. | 358/241 |
| 5,126,882 | 6/1992 | Oe et al. | 359/619 |
| 5,128,783 | 7/1992 | Abileah et al. | 359/49 |
| 5,128,787 | 7/1992 | Blonder | 359/70 |
| 5,151,801 | 9/1992 | Hiroshima | 359/40 |
| 5,161,041 | 11/1992 | Abileah et al. | 359/40 |
| 5,182,663 | 1/1993 | Jones | 359/70 |
| 5,202,950 | 4/1993 | Arego et al. | 385/146 |
| 5,206,746 | 4/1993 | Ooi et al. | 359/40 |
| 5,211,463 | 5/1993 | Kalmanash | 362/26 |
| 5,237,641 | 8/1993 | Jacobson et al. | 385/146 |
| 5,253,089 | 10/1993 | Imai | 359/49 |
| 5,253,151 | 10/1993 | Mepham et al. | 362/216 |
| 5,262,880 | 11/1993 | Abileah | 359/40 |
| 5,262,928 | 11/1993 | Kashima et al. | 362/31 |
| 5,267,062 | 11/1993 | Bottorf | 359/40 |
| 5,267,063 | 11/1993 | Ray | 359/49 |
| 5,276,538 | 1/1994 | Monji et al. | 359/40 |
| 5,278,545 | 1/1994 | Streck | 345/102 |
| 5,280,371 | 1/1994 | McCartney, Jr. et al. | 359/40 |
| 5,295,048 | 3/1994 | Park et al. | 362/26 |
| 5,303,322 | 4/1994 | Winston et al. | 385/146 |
| 5,359,691 | 10/1994 | Tai et al. | 385/146 |

FIG. 11 ained in a unitary structure. For example, in typical office
LIGHT DIRECTING OPTICAL STRUCTURE

CROSS REFERENCE TO RELATED APPLICATIONS

This application is a continuation-in-part of three U.S. patent applications: Appl. No. 08/149,219, filed Nov. 5, 1993, now U.S. Pat. No. 5,424,460 Appl. No. 08/242,525, filed May 13, 1994, now U.S. Pat. No. 5,428,468 and Appl. No. 08/321,368, filed Oct. 11, 1994, now pending each of which is hereby incorporated by reference.

BACKGROUND OF THE INVENTION

The invention relates generally to optical structures which receive light from relatively uncontrolled sources in terms of directivity and uniformity and emit a spatially-controlled light distribution with respect to the two orthogonal axes defined with respect to the direction of propagation of the light source, and relates particularly to such structures utilized for residential, commercial and industrial lighting applications.

The ability to control the light distribution from various light sources, such as a point source or an extended source about two orthogonal axes has not been successfully implemented in a unitary structure. For example, in typical office lighting applications using fluorescent lighting, no single element is able to simultaneously control the light distribution about two axes. A fluorescent light contains a single reflector which is only able to provide directivity along one axis. Alternatively, if two axes control is attempted with the present technology, a reflector and luminaries are required. This combination, however, provides efficiency losses, suffers from non-uniformity and creates a complex and bulky arrangement.

It would be desirable to have a relatively robust, lightweight and efficient optical structure that would fit easily within a small form factor and that would be able to receive light from any light generating means. Such a structure would permit new and useful ways to provide directed light distribution for various lighting applications.

SUMMARY OF THE INVENTION

The present invention provides for an integrated light directing structure which provides a spatially-directed light output along two orthogonal dimensions as required by the particular application.

The invention comprises a light source in combination with an optical structure which comprises a waveguide component which accepts the light generated by the light source and transports the light via total internal reflection (TIR). Optically coupled to or integrally formed with a surface of the waveguide are a multiplicity of prisms. Each prism, due to its index of refraction, provides an aperture where light may escape the waveguide rather than remain confined due to total internal reflection. The light escaping the waveguide is reflected from a side face of the prism, and redirected in the desired output direction.

The geometry of the prism can be optimized to direct the output at any desired angle from the surface of the waveguide. Advantageously, the optical structure, which might be characterized as a light directing structure, can have a narrow profile, and the waveguide structure is suitable to allow light coupling along an light input edge, or along several light input edges. Furthermore, there is no restriction on the distribution and uniformity of the light input to the waveguide.

There are many illumination applications that can take advantage of this invention. Such applications exist in commercial and residential markets and in various industries such as the automotive industry and the aerospace industry. Exemplary residential and commercial applications include low profile interior and exterior lighting such as spotlights, room or office lighting and accent lighting. Exemplary automotive applications include low profile car headlights and taillights, low profile interior car lights such as reading lights and map lights and light sources for dashboard displays and instrument panels.

BRIEF DESCRIPTION OF THE DRAWING

The invention will be described with respect to a drawing of several figures, of which.

Where possible, like elements have been shown with like reference numerals.

DETAILED DESCRIPTION

One of the basic building blocks of the apparatus according to the invention is a prism optically coupled to a waveguide. While the apparatus typically may contain hundreds or thousands of prisms arranged in some pattern or array, it is instructive to consider one prism in detail.

Figure 1:
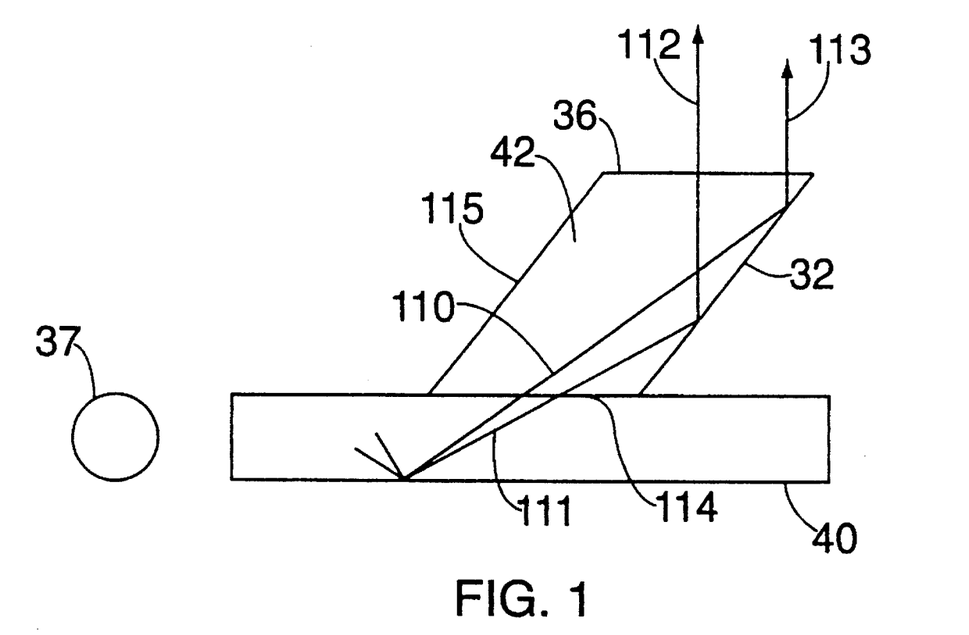
FIG. 1 is an illustration of a single prism optically connected to a waveguide and showing the characteristics of light rays.
Figure 1A:
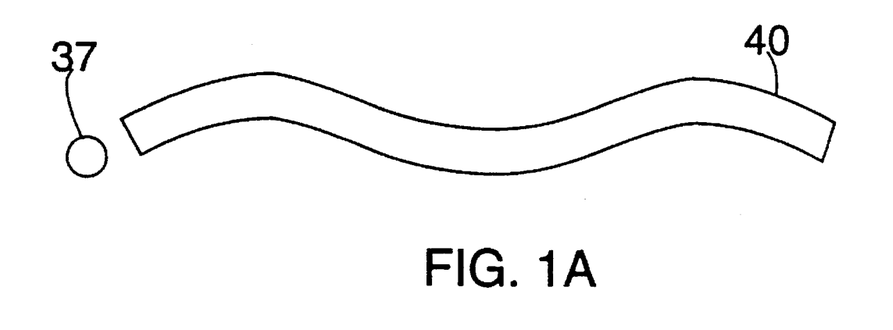
FIG. 1A is an alternate embodiment of a waveguide.

With reference to FIG. 1, light rays, as exemplified by light rays 110 and 111, totally internally reflect through waveguide 40. Waveguide 40 may be a light pipe, light wedge or any other structure known to those skilled in the art. It may have planar surfaces or alternatively may have non-planar sectioned surfaces as shown in FIG. 1A. For simplicity, and for descriptive purposes, but by no means intended to be limiting in nature, waveguide 40 is illustrated as being planar, and the microprisms 42 discussed below are referenced interfacing with a planar waveguide. As is well known to those skilled in the art, total internal reflection occurs if light within a medium strikes a boundary and bounces back into the medium. For such a reflection to occur, the index of refraction of the medium has to be higher than the index of refraction for the material on the other side of the boundary, and the angle of reflection must obey Snell's Law. For simplicity of analysis one assumes that the material outside the waveguide 40 is air, with an index of refraction of one. The invention does not require this, however, and may be practiced with materials other than air outside the waveguide.

Light rays emanating from light source 37 are bound by a "critical angle" within waveguide 40 as determined by Snell's Law. Light rays 110 or 111, but for the presence of prism 42, would be totally internally reflected within waveguide 40. Prism 42 has an index of refraction approximately equal to or greater than the index of waveguide 40, and ray 110 and 111 are able to exit waveguide 40 and enter prism 42. This situation exists whether prism 42 is integrally formed with waveguide 40 or whether it is separately formed and then integrated with waveguide 40 using an adhesive or other suitable means. After ray 111 enters prism 42, it internally reflects to make ray 112. Similarly, ray 110 undergoes a reflection to make ray 113. The range of angles of rays, such as 112 and 113, is related to the distribution of angles of light rays within waveguide 40. Because the rays within the waveguide are constrained, the rays exiting the prism are found mostly in a fairly narrowly constrained range of angles. Accordingly, this leads to the result that relatively undirected light can be coupled into waveguide 40 and a substantial portion of that light exits prism 42 as a directed light source.

Figure 2:
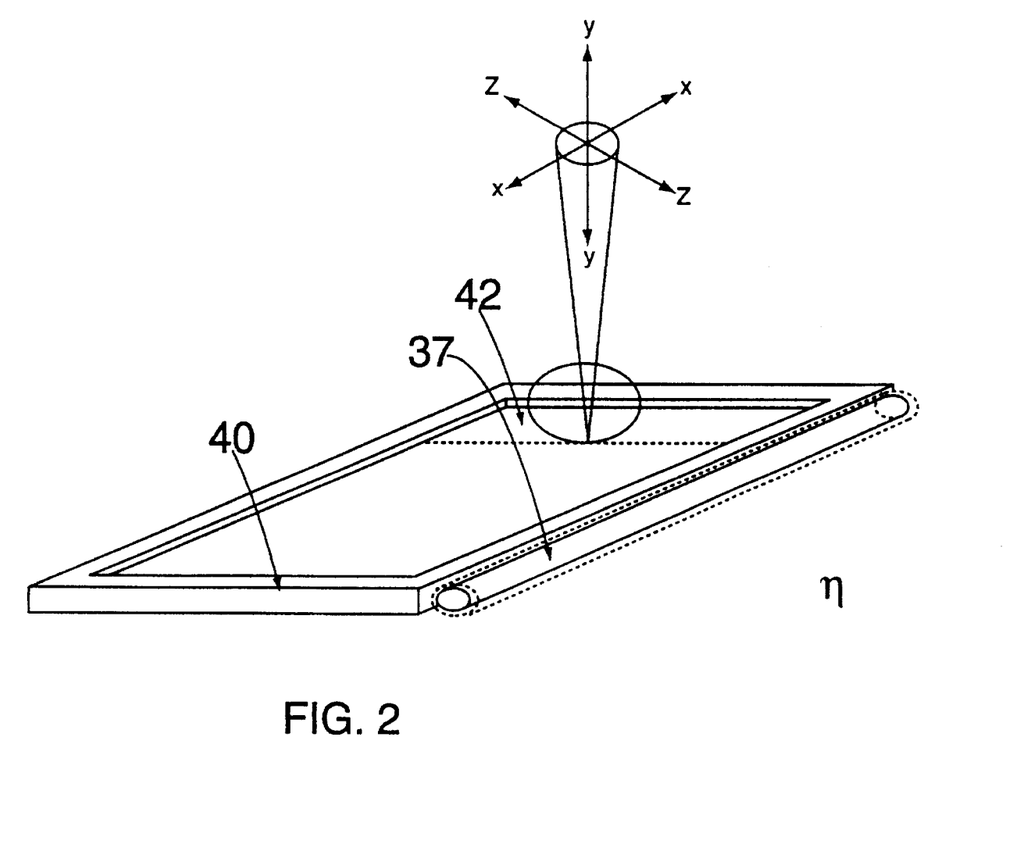
FIG. 2 illustrates the light distribution output of the invention about two orthogonal axes.
Figure 4A:
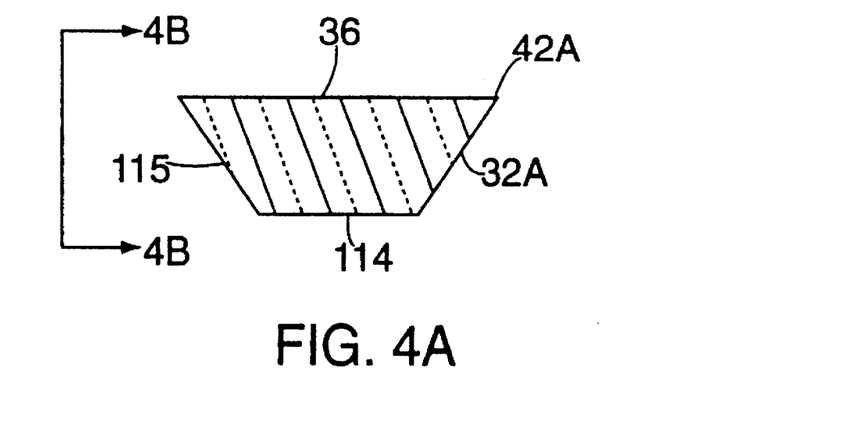
FIGS. 4A and 4B is an alternate embodiment of a prism.
Figure 4B:
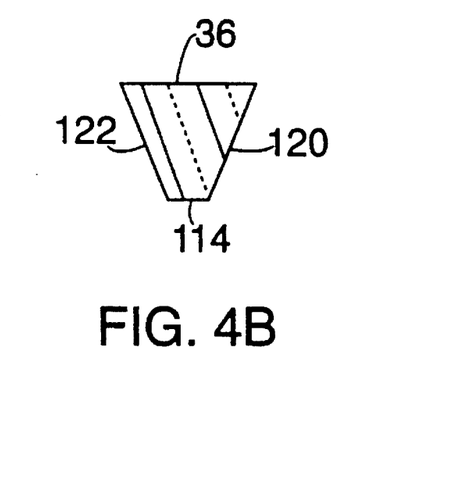
Figure 4C:
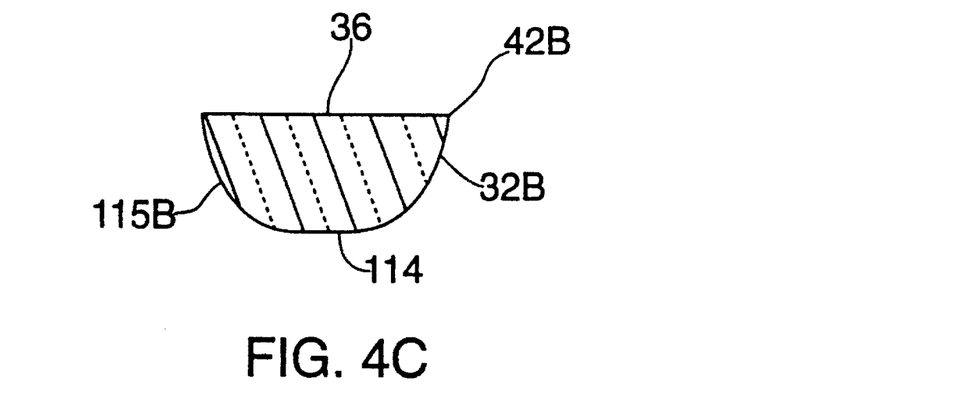
FIG. 4C is a further alternate embodiment of a prism.
Figure 6:
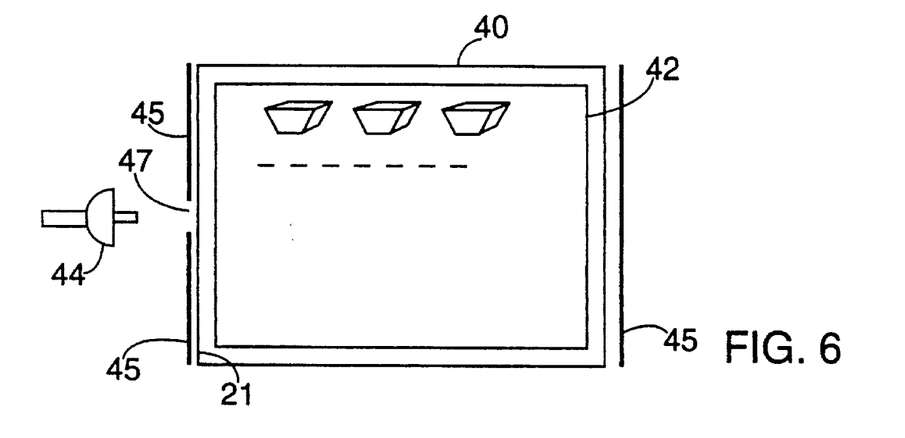
FIG. 6 is a plan view of the invention where the prisms are illustrated as a single sheet for simplicity purposes in combination with a point light source.
Figure 7:
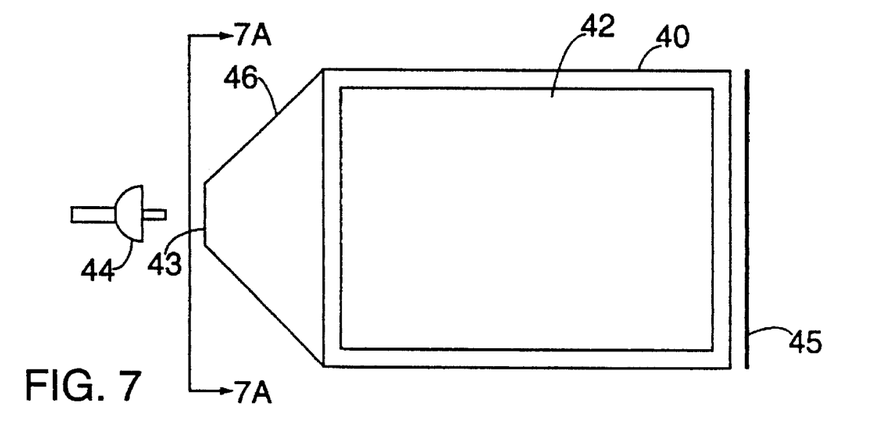
FIG. 7 is a plan view of the invention in combination with a point light source and a light source homogenizer.

Those skilled in the art will appreciate that some of the faces of prism 42 are critical. First face 114 preferably is planar (this, however, would not be true for waveguides as shown in FIG. 1A) so as to have intimate optical coupling with the planar face of waveguide 40. Second face 32 need not be absolutely planar, but could be curved somewhat or could be faceted, and still bring about the interesting results described; for that reason, it might be said that second face 32 is merely substantially planar. Third face 36 likewise need not be absolutely planar. It can also be formed into either a convex, concave lens, and even an aspherical lens without departing from the results described. For a broadband light source, it is desired that the surface of third face 36 be more or less perpendicular to the desired light exit direction. This minimizes refraction of the exiting light; thereby minimizing the breaking up of a white light into colors. One way to describe the desired orientation is that third face 36 has a region tangent to a plane perpendicular to the desired light output direction, a terminology that embraces the possibility that the face might be planar or might be a lens. Those skilled in the art will appreciate that nothing in this discussion demands any particular shape to the fourth face 115. In this embodiment, the control of the light output would be in only one viewing direction. In a preferred embodiment, however, fourth face 115 is also used to reflect light from the waveguide 40 using the same principles as face 32. In the most preferred embodiment, fifth face 120 and sixth face 122 also reflect light rays exiting from waveguide 40. A cross section view of the preferred embodiment of prism 42 is shown in FIGS. 4A and 4B and disclosed in detail in referenced patent application Ser. No. 08/242,525. In this most preferred embodiment, light rays traveling in different directions within waveguide 40 will enter prism 42 and reflect off all prism faces. This situation arises when multiple light sources are used or where reflective material recycles light back into the waveguide as shown in FIGS. 6 and 7. This embodiment is preferred because it provides for control of the light distribution, both in intensity and direction, about two viewing axes, xz and yz, as shown in FIG. 2 and provides for efficient extraction of light from waveguide 40. Furthermore, none of the foregoing discussion demands that any of the faces of prism 42 join in a simple edge; if something about the fabrication technique, for example, required that the edge connection between faces be beveled or rounded, this would not depart from the invention. In addition, it is not necessary that first face 114 and third face 36 be parallel. Those skilled in the art will appreciate that in some applications, a slight taper might be preferred to distribute the light output from prisms 42.

There is no requirement, other than perhaps ease of fabrication or adaptation to a particular light pattern, that all prisms 42 be identically shaped or evenly shaped. As set forth in the referenced patent applications, the spacing of prisms 42 may vary over the expanse of the waveguide to accommodate the distance of a prism 42 from the light source. Furthermore, prisms 42 may attach to waveguide 40 in selected regions so as to only allow light to escape waveguide 40 at selectively desired locations as dictated by the application. Also, the angles of prisms 42 may be provided over some distribution to yield more light at one particular exit angle and less at other exit angles, or to yield intentionally asymmetric spatial distributions of exiting light.

Figure 3:
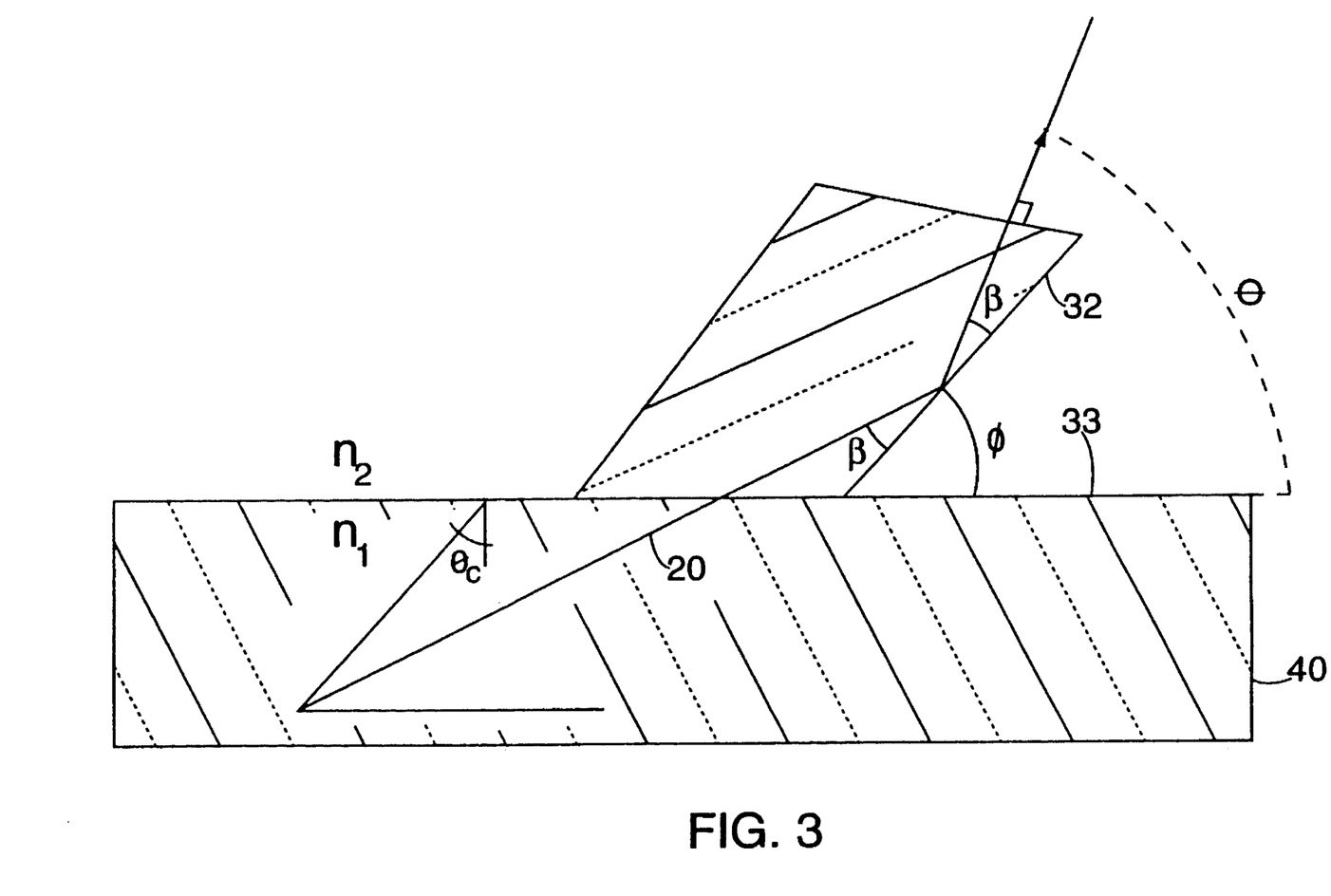
FIG. 3 is a cross sectional view illustrating the geometries of the prism and waveguide.

Because the invention may be applied to many different applications, from automobile headlamps to lighting for an galleries, it is desirable to be able to vary the orientation of prisms 42 with respect to waveguide 40 to bring about a particular desired light distribution output. Reference is now made to FIG. 3. We will assume for simplicity that the index of refraction of prism 42 is equal to the index of refraction of waveguide 40. Snell's Law determines the angular spread of the light propagating in waveguide 40 with respect to the critical angle $\theta_c$. Preferably, and in the case of a broadband light source, defined as 400–700 nm, light ray 20 represents the median ray of the light output distribution. For illustration purposes only, median light ray 20 reflects off the second face 32 and exits prism 42 at an angle perpendicular to the tangent of the third face 36 and at an angle $\beta$ with respect to second face 32. The directional output of median light ray 20 also forms an angle $\theta$ with respect to the surface 33 of waveguide 40. Angle $\theta$ is a function of the particular lighting application which would specify some light distribution output pattern. For a waveguide having light rays from all angles from 0° to $\theta_c$, a simple relationship exists between the desired angle of the light output $\theta$ with the tilt angle, $\phi$, second face 32 forms with the surface 33 of waveguide 40. Angle $\theta = 2\phi - 45 + \theta_c/2$ where $\theta_c$ is the critical angle defined by Snell's Law and equals $\sin^{-1}(n_2/n_1)$ where $n_1$ equals the index of refraction of waveguide 40 and and $n_2$ equals the index of refraction of the material outside the waveguide 40 (for example, in the case of air, $n_2 = 1.00$). A similar relationship can be derived where the index of refraction of waveguide 40 and prism 42 do not match.

Furthermore, the third or top face 36 is preferably perpendicular to the exit direction for the light, to avoid refraction of the output light into colors. In the case where the light source is narrow band in nature, such as a LED or laser, however, the above equation for angle $\theta$ does not appliy because the median light ray 20 is not restricted to exit the prism 42 at an angle perpendicular to the tangent of the third face 36.

FIG. 4 shows alternative prism shapes 42A, 42B for the cross section of FIG. 1. It should be appreciated from these figures that the first face of the prism (coupled with the waveguide 40) is planar, but the second face 32A and 32B need merely be substantially planar. Depending on fabrication techniques and the desired light spill pattern the second face 32A and 32B could be curved or could be planar in two slightly different adjoining planes, without departing from the invention.

Figure 5:
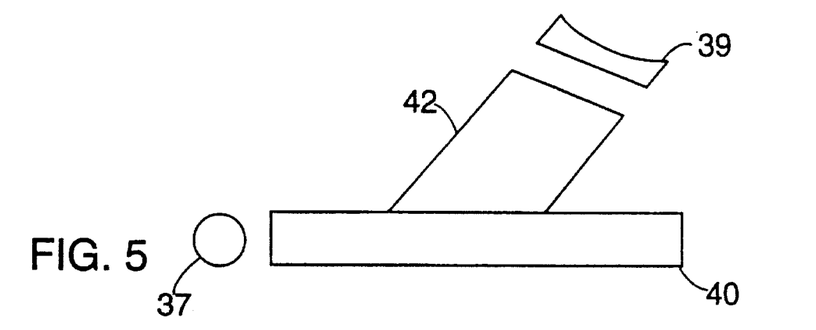
FIG. 5 illustrates a waveguide and a prism in combination with a negative lens structure.

FIG. 5 shows a cross section of a prisms 42 in optical cooperation with a corresponding concave lens 39. As would be obvious, if multiple prisms 42 were arranged in any specific pattern, a lens 39 would correspond with each prism 42. In such an embodiment, the light output of prism 41 is broadened to match the requirements of the particular application. For example, a prism with an index of refraction of 1.45, the light output distribution is +/– 35 degrees and a properly positioned de-focusing element, such as a concave lens 39, would provide a greater angular spread to the light distribution. This embodiment could be advantageously used in a commercial lighting application where the preferred angular light distribution is +/– 60 degrees. Alternatively, scattering elements, either internal or external to prisms 42, may be used to broaden the output distribution, but with a loss of efficiency An alternate embodiment of the invention is illustrated in FIG. 6 which represents in plan view an array of light directing prisms 42 attached to a waveguide 40 which is optically coupled with a reflector arc light source 44, such as a metal halide lamp, at one edge 21. The lamp 44 is positioned substantially a focal length away from the edge to allow the focused rays to couple efficiently into waveguide 40. Preferably, lamp 44 also comprises a light filtering device to selectively transmit and or reflect various spectural content of the lamp. For example, if waveguide 40 is a plastic material, infared light may provide unwanted heat buildup. Additionally, light reflecting means 45, such as specular or diffusive reflectors, define an aperture 47 along edge 21. Preferably, reflecting means 45 is also employed along the oppositely disposed edge of waveguide 40 to recycle light rays back into waveguide 40 that did not escape into prisms 42.

In order to improve the uniformity of the light emitted from the waveguide 40, a light source homogenizer 46, preferably made of the same material as waveguide 40, allows the light rays from point light source 44 to uniformly fill the width of waveguide 40 shown in FIG. 7. This embodiment prevents uneven light brightness within waveguide 40 and results in a more uniform extraction of light from waveguide 40 by prisms 42. Light source homogenizer 46 may be trapezoid-shaped or any other appropriate shape. A light reflecting material 45, specular or diffusive in nature, at the end away from light source 44 may also be employed to recycle light. The light source may be a parabolically focused short arc light source. Alternatively the shape of the light source reflector may be modified to uniformly fill waveguide structure 40 without the need for homogenizer 46.

Figure 7A:
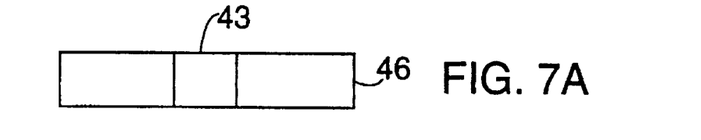
FIG. 7A is an elevation view at the input face of a light source homogenizer.

FIG. 7A shows head-on the input face 43 of the trapezoid of FIG. 7. The input face 43 need not be square but need merely be selected to be larger than the spot of light from the parabolic reflector.

Figure 8:
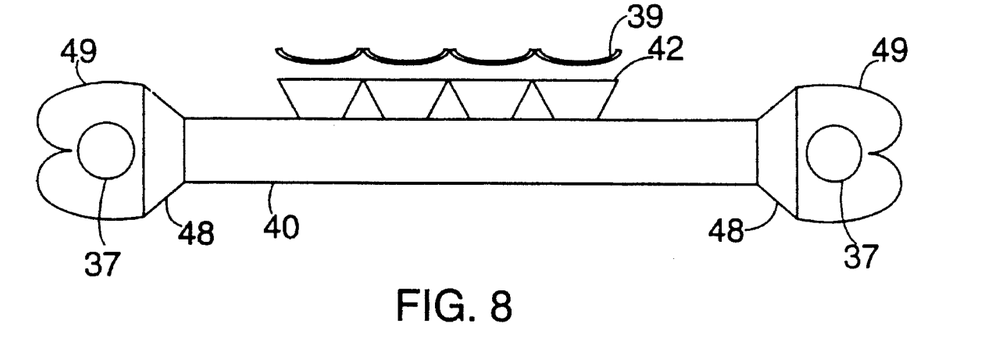
FIG. 8 illustrates the invention in combination with a tapered input waveguide, an involute reflector and an array of negative lenses.

FIG. 8 shows a shallow light fixture according to the invention using two extended light sources 37 and an array of concave lenses, together with trapezoid prism input structures 48 and arcuate reflectors 49. Alternatively, a reflective material may be substituted for one of the two trapezoidal prism input structure 48, light source 37 and reflector 49 combination to recycle light within waveguide 40. The trapezoidal prisms 48 are tapered sections optically coupled with waveguide 40 which gather light from the extended light sources through a fairly large area, and through TIR the light is guided into the thin main waveguide 40. Because the smallest commercially available fluorescent bulbs are 10–12 mm, the tapered structure is needed to reduce the thickness of waveguide 40 so that waveguide 40 has a thickness much less than dictated by the diameter of the light source. To maximize the efficiency of transfer of light into the waveguide, an involute or arcuate-shaped reflector 49 is preferred to avoid redirection of light back to the source. Reflector 49 redirects the light that was not directly coupled into prism 48, and through one or two reflections the light has additional opportunities to enter prism 48. Alternate configurations of reflector 49 are possible as is known to those skilled in the art. An array of negative lens structures 39 may be used to efficiently spread the light output of prisms 42 to a wider distribution angle. If the diameter of light source 37 is $d_L$ and the height of the input face of trapezoid prism 48 is D, a typical ratio is D : $d_L$ of about 2:1. The waveguide thickness $d_W$ is much less than $d_L$, and may be 2 mm.

It should be appreciated that this structure offers previously unavailable architectural opportunities. For example, the light fixture is quite shallow and so does not require a thick ceiling. Where dropped ceilings are used the dropped ceiling need not be positioned very far down from the higher fixed ceiling, therefore offering cost-effective building techniques, heretofore unavailable because of bulky lighting fixtures. Other benefits include improved light uniformity over two dimensions, less glare in peripheral vision of those in the space being illuminated, more efficient use of the light since it can be directed to the areas of interest utilizing appropriately shaped prisms and lenses. Furthermore, the prism coverage and size may be varied across the waveguide to provide uniform illumination in the target area.

Figure 9:
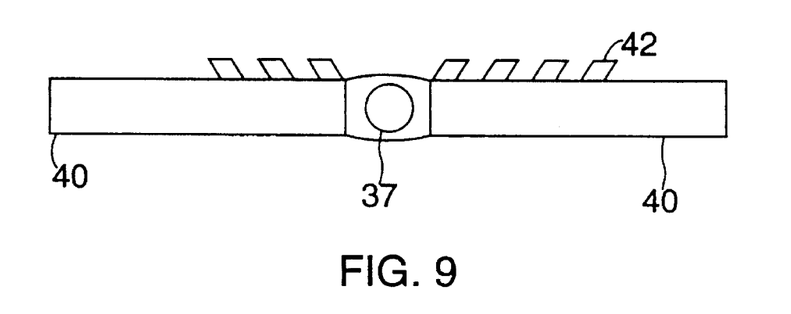
FIG. 9 is an elevation view of a single light source in combination with two light directing structures.

While one embodiment may comprise two extended light sources as discussed above, an alternative as shown in FIG. 9 may be used. Here, multiple waveguides structures 40 may share a common light source 37. This arrangement increases the light efficiency since more of the light from light source 37 is directly coupled to one or another of the adjacent waveguides 40. Preferably, reflectors surround light source 37 to couple otherwise stray light to the waveguides through one or more reflections. As would be obvious to those skilled in the art, additional waveguides 40 could be coupled to light source 37 and additional light sources could be coupled to other available edges of waveguide 40.

Figure 10:
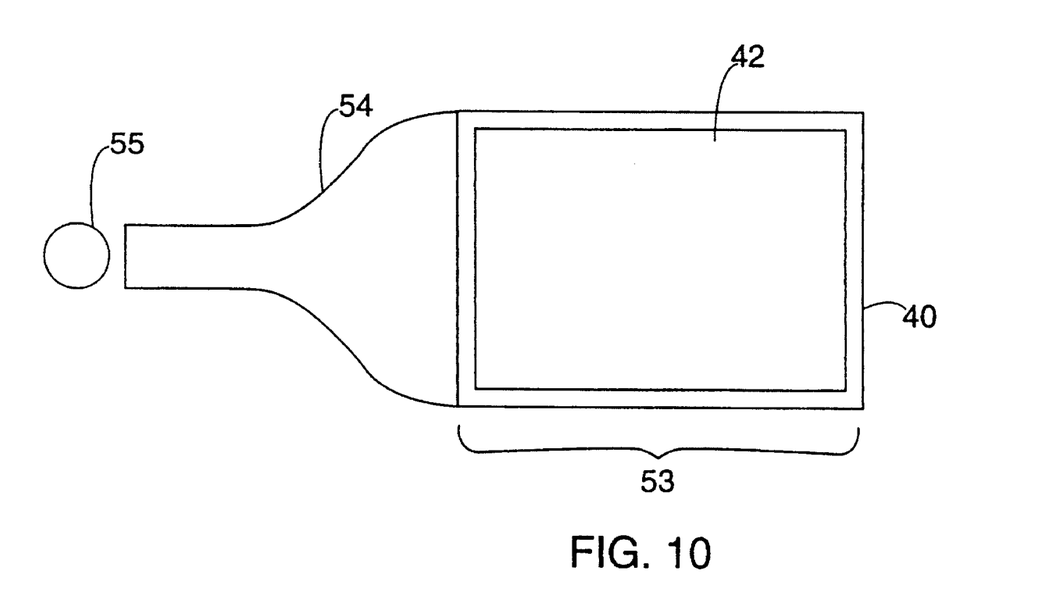
FIG. 10 is a plan view of light directing structure remotely located from a light source.

FIG. 10 repesents an array of light directing prisms 42, waveguide 40, in combination designated as a light directing structure 53 and an additional waveguide structure 54 optically coupled to a light source 55. This permits light source 55 to be remote from structure 53. For example, structure 53 may be relatively inaccessible to users and yet the light source 55 can be accessible. Such an occurrence may arise when structure 53 may be in a ceiling and the light source 55 may be at floor level to facilitate maintenance of the light source 55. Another example would be roadway signage, where structure 53 illuminates road signs high above the roadway. Here, light source 55 could be at the road surface. One advantage is easier servicing when the lamp 55 must be replaced. Another advantage is that the heat source is removed from the illumination source. One example of additional waveguide structure 54 is a bundle of optical fibers arranged along an edge of waveguide 40. The fiber bundle could optionally be replaced by other waveguide structures which transmit light with low loss through total internal reflection. Depending on the source, more than one light directing structure could be coupled to the light source. This could be useful in automotive lighting as well as commercial room lighting. Preferably at least 60% and more preferably 70% of the light from the source is distributed to the desired location.

Figure 11:
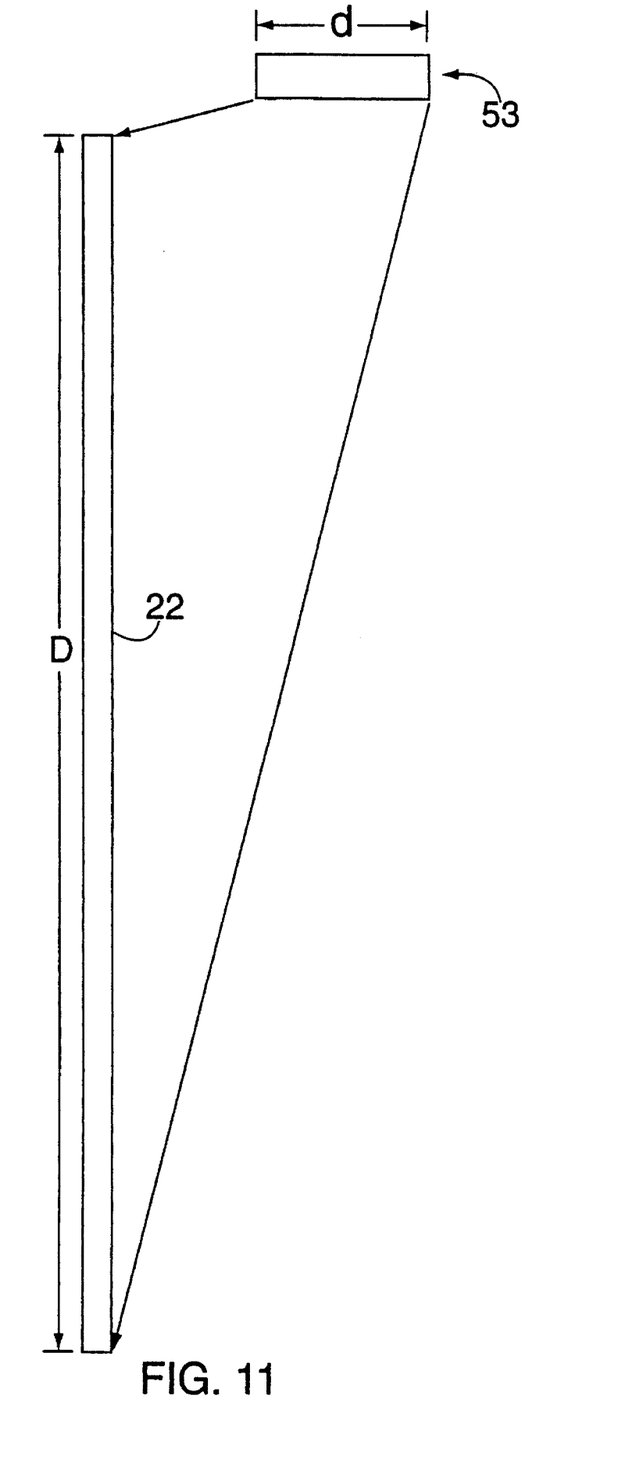
FIG. 11 is an elevation view of the invention optimized for illuminatin from the ceiling of a large flat object on the wall.

FIG. 11 shows a light source according to the invention optimized for illumination from the ceiling of a large flat object 22 on a wall. Most light fixtures fail to provide appropriate lighting for such objects. This invention allows for asymmetric light distribution as required by this application. This is accomplished by selecting the shapes of the prisms of the film, and by selecting how many prisms of each shape are provided on the film. A structure 53 only "d" inches wide, of shallow vertical dimension, can nonetheless provide even illumination across an object (e.g. a painting) that is "D" inches tall where D is much larger than d.

What is claimed is:

1. An apparatus for directing light in a desired direction, the apparatus comprising:
   a) a first waveguide having a first edge and a second edge opposed thereto, said first waveguide having an index of refraction higher than that of its surroundings;
   b) a quadrilateral second waveguide, said second waveguide having an index of refraction higher than that of its surroundings and having first, second, third, and fourth edges, the first edge of the second waveguide optically coupled with and sized to fit the first edge of the first waveguide; the fourth edge opposed to the first edge of the second waveguide, said fourth edge defining an input face; said second and third edges connecting said first and fourth edges, said second and third edges each defining respective acute angles with said first edge; and
   c) a multiplicity of prisms optically coupled with a face of said planar first waveguide.

2. The apparatus of claim 1 further comprising a parabolically focused light source optically coupled to said input face.

3. The apparatus of claim 1 wherein the first and second waveguides are integrally formed.

4. The apparatus of claim 1 wherein the first waveguide is substantially rectangular.

5. A light directing apparatus comprising:
   a) a first waveguide having a first edge and a second edge opposed thereto, said first waveguide having an index of refraction higher than that of its surroundings;
   b) a substantially trapezoidal first prism, said first prism having an index of refraction higher than that of its surroundings, the trapezoidal cross section of the first prism defining first and second parallel sides and third and fourth sides, the prism face containing said first side optically coupled with and sized to fit the first edge of the waveguide; the prism face containing said second side being larger in area than said prism face containing said first side and defining a first input face; said second and third sides each defining respective acute angles with said second side; and
   c) a multiplicity of second prisms optically coupled with a face of said planar first waveguide.

6. The apparatus of claim 5 further comprising a first extended light source optically coupled with the first input face.

7. The apparatus of claim 6 further comprising a first involute reflector surrounding said first light source and mechanically coupled with said first input face thereby defining a first enclosure about said first light source.

8. The apparatus of claim 5 wherein the waveguide and first prism are integrally formed.

9. The apparatus of claim 5 further comprising a substantially trapezoidal third prism, said third prism having an index of refraction higher than that of its surroundings, the trapezoidal cross section of the third prism defining first and second parallel sides and third and fourth sides, the prism face containing said first side optically coupled with and sized to fit the second edge of the waveguide; the prism face containing said second side being larger in area than said prism face containing said first side and defining a second input face; said second and third sides each defining respective acute angles with said second side.

10. The apparatus of claim 9 further comprising a second extended light source optically coupled with the second input face.

11. The apparatus of claim 10 further comprising a second involute reflector surrounding said second light source and mechanically coupled with said second input face thereby defining a second enclosure about said second light source.

12. The apparatus of claim 5 wherein the waveguide and second prism are integrally formed.

13. An apparatus for directing light in a desired direction, the apparatus comprising:
   a) a waveguide having an edge for coupling to a light source, the wave guide having an index of refraction $r_1$, the surroundings of the waveguide having an index of refraction $n_o$, the ratio of $n_o$ to $n_1$ defining a ratio $r_1$; the waveguide having first and second sides;
   b) a multiplicity of prisms each having a respective index of refraction $n_2$, the ratio of $n_0$ to $n_2$ defining a ratio $r_2$, the ratio $r_2$ approximately equal to $r_1$, each prism having at least first, second, and third faces; and
   c) the first, second, and third prism faces characterized in that the first face is optically coupled to said waveguide; the second face is substantially planar, and defines a tilt angle with respect to said first side, the third face of each prism having a portion tangent to a plane substantially perpendicular to the desired light output direction.

14. The apparatus of claim 13 wherein the first and second sides of the waveguide are parallel.

15. The apparatus of claim 13 wherein the waveguide and prisms are integrally formed of the same material.

16. The apparatus of claim 13 wherein the waveguide and prisms are formed separately and attached so as to be optically coupled.

17. The apparatus of claim 13 wherein the desired light output direction is substantially perpendicular to the first side of the waveguide.

18. The apparatus of claim 13 wherein the second face of each prism is planar.

19. The apparatus of claim 13 wherein the third face of each prism is planar.

20. The apparatus of claim 13 wherein the third face of each prism is a convex lens.

21. The apparatus of claim 13 wherein the third face of each prism is a concave lens.

22. The apparatus of claim 13 wherein the third face of each prism is an aspheric lens.

23. An apparatus for directing light in a desired direction, the apparatus comprising:
   a) a first waveguide having a first edge and a second edge opposed thereto, said first waveguide having an index of refraction higher than that of its surroundings;

b) a second waveguide optically coupled to the first edge; and c) a multiplicity of prisms optically coupled with a face of said planar first waveguide.

24. The apparatus of claim 23 further comprising a reflecting sheet at the second edge of the first waveguide disposed to reflect light within the first waveguide.

25. The apparatus of claim 23 further comprising a light source optically coupled with said second waveguide and remote from said first waveguide.

26. The apparatus of claim 23 wherein the second waveguide is a bundle of fiber optic cables.

* * * * *